United States Patent [19]

Hoge

[11] 4,419,135

[45] Dec. 6, 1983

[54] METHOD OF PREPARING CEMENTITIOUS COMPOSITIONS FOR TUNNEL BACKFILL

[75] Inventor: John H. Hoge, Cincinnati, Ohio

[73] Assignee: Molecrete Corporation, Cincinnati, Ohio

[21] Appl. No.: 309,019

[22] Filed: Oct. 6, 1981

[51] Int. Cl.$^3$ .............................................. C04B 7/35
[52] U.S. Cl. ........................................ 106/88; 106/90; 106/97; 106/98
[58] Field of Search ................. 106/88, 90, 97, 98

[56] References Cited

U.S. PATENT DOCUMENTS

| | | | |
|---|---|---|---|
| 3,955,992 | 5/1976 | Roberts | 106/98 |
| 3,972,723 | 8/1976 | Balle et al. | 106/98 |
| 3,997,502 | 12/1976 | Schaupp | 106/90 |

*Primary Examiner*—James Poer
*Attorney, Agent, or Firm*—Frost & Jacobs

[57] ABSTRACT

A cementitious composition for backfilling and sealing tunnels and other underground structures comprising 12–16 parts sand, 3–6 parts cement, 1.5–3 parts water, 0.1–0.5 parts plasticizer and 0.02–0.04 parts of a pituitous water soluble polyethylene oxide thickening agent.

28 Claims, No Drawings

METHOD OF PREPARING CEMENTITIOUS COMPOSITIONS FOR TUNNEL BACKFILL

BACKGROUND OF THE INVENTION

1. Field of the Invention

This invention pertains to a cementitious composition for use as backfill and annulus fill for underground pipelines constructed by boring, particularly or use in soil conditions wherein substantial ground water is encountered.

There are many types of underground structures in which cementitious fill materials are used, either as the primary solid or as a binder for aggregates. The design and selection of suitable cementitious material is perhaps more difficult than for surface structures because of the variable conditions that can occur, and for which there is often only limited information. Tunnels, pipelines, oil wells, piles, caissons, control rooms, mines, piers, dams, and earth slide areas are examples. Construction must cope with ground water, unstable and low bearing capacity soils, subsoil voids and caverns, lithostatic pressures, corrosive soil chemicals, difficult placement conditions, often remote from the surface, high temperatures and many other conditions not encountered in monolithic structures built on the surface.

2. Description of the Prior Art

The terms "cementitious material" and "cement," as used herein, means compounds that in contact with water react therewith and undergo a crystalline transformation. Examples would be the various types of Portland cement, certain autoclaved gypsum stuccos, high alumina cements, pozzolana cements, magnesia cements and the like. In this hydration process, the newly formed crystals interlock to become a rigid, continuous mass. Such materials can be used by themselves to make structures such as floors, walls, beams, pipe and a vast number of well-known items, but more often, mainly for cost considerations, they are used as binders of inexpensive filler materials such as sand and gravel. When cementitious materials are used with sand only, the mixture is commonly called "grout" or "mortar." If sand and gravel both are used, the mixture is called "concrete." If the cementitious material alone is used, it is termed "neat."

Since the conditions in which the cementitious compositions must be placed in underground construction vary widely and are often unpredictable, the design of mixes that can flow freely through long lengths of conduit and through forms or earth spaces that may cause the mix to dilute or dewater, or both, is critical.

The backfilling of tunnels and the filling of the annular space between the liners used in bore-type tunnels and the pipe or conduit set therein often involves a variety of requirements. A high degree of fluidity or flowability is desired, so as to minimize the number of downholes or injection holes needed to insure complete filling of the space. Limiting the attainment of high fluidity is the prerequisite to maintain the lowest possible water content for strength considerations and for reasons of preventing stratification, since any water layer at the top of the cast resulting from settlement of the dense aggregates and cement will become a void at the point where the soil overburden requires greatest support.

A very critical consideration is the presence of ground water, either ponded in the pour cavity or flowing therein. If the concrete or cementitious material is made fluid by use of a high water/cement ratio, in order to facilitate placement, it thereby also becomes more susceptible to dilution as it flows through ponded water, and flowing ground water will leach out the cementitious material as well as other fines such as sand or fly ash. The true strength of the final set cast thus becomes variable, as is the extent to which the cavity is actually filled after the excess water rises to the top when the concrete comes to rest. If, as an alternative, a fairly stiff, 2-3 inch slump concrete, cohesive enough to resist dilution by water, is used, this limits the distance the concrete will flow, hence requires a greater number of expensive downholes or pump hose line input points.

The placement of tunnel fills differ from the well-known technique of tremie placement. Generally tremie concreting involves the filling of a vertical cavity, and the hose or pipe extends to and discharges at the bottom, so that any water standing in the vertical cavity is lifted by the denser concrete and only a few inches of the top surface of the concrete placement is degraded by the water. Tunnel backfilling usually involves downflow from the surface also, but then the fill material must flow horizontally through irregular, often narrow, cross sections, one face of which may be soil of unpredictable texture. If groundwater is present, it will be ponded or will be flowing in the lower portions of the cavity. Even if the incoming concrete is displacing ponded still water, it is obvious that the leading edge of the concrete is subjected to much more washing and leaching action than in the case of tremie placement, and the extent of degradation will be much more severe. Even more serious, however, are cases in which there is a continuous flow of groundwater into the cavity in spite of the use of external dewatering pumps. This adds the erosive and diluting action of running water to that of the water lying on the cavity bottom. The placement of the cementitious composition is often impaired by conditions the reverse of the above. The horizontal flow of the composition may be inhibited or even prevented by its passage through dry soil or other surfaces that dewater the composition and reduce it to a semi-solid, nonflowing state. The general approach to preventing this is to add a water thickening agent. Thickeners are gelling compounds that physically entrap water within their long-chain, convolute molecular clusters, or to some degree absorb water, sometimes with weak hydrogen-hydroxyl bonding. The long-chain molecules also act like dispersed fibers to increase the fluid viscosity of the solution. Gum arabic and gelatin are examples of water thickeners. For oil well cementing, commercial type agents are used. Thus R. A. Salathiel, U.S. Pat. No. 2,582,459, employed bentonitic and montmorillonite clay in 1952, as did John V. Drummond, U.S. Pat. No. 2,876,123, 1959. The development of synthetic thickeners was exploited by Robert C. Martin, U.S. Pat. No. 3,234,154, 1966, using sulfonated polyvinyl styrene and polyvinyl toluene, and Charles F. Weisend, U.S. Pat. No. 3,132,693, 1964, and U.S. Pat. No. 3,359,225, 1967, using hydroxyethyl cellulose and polyvinylpyrrolidone. There are several other such agents used in the art.

All of the thickeners heretofore used in oil well cementing dissolve and fully disperse relatively rapidly in water. Their thickening action increases the viscosity of the cementitious composition, an effect that can be countered by the addition of a dispersing agent which would, in the absence of the thickener, increase the fluidity of the mix. To some degree, the gelatinizing of the water imparts lubricity, since the presence of the gel, and its coating of the angular solid particles, reduces the friction between the slurry and the conduit or medium into which the slurry is flowing. The major objective, however, is to "thicken" the water and reduce its ability to be absorbed or dry surfaces with which it comes in contact during placement.

Foamed or cellular concrete can be used as tunnel backfill under certain conditions. The limitation is that there be no ground water seepage in the cavity or any ponded or impounded free water, since water will disintegrate the foam of the mix and result in collapse separation into a top layer of foam, a middle layer of water and cement last at the bottom. Cellular or light-weight aggregate concrete is useful and economical in the 25 to 50 pounds per cubic foot density, giving strengths of 150 to 400 pounds per square inch, because such material pumps and flows readily over long distances. Obviously, however, such a composition will float on a 62.5 pounds per cubic foot liquid, such as water, hence cannot be used except in "dry" tunnels. At higher densities that could displace water, e.g. 70 pounds per cubic foot or more, the cost is almost double that of the conventional mortars and concretes currently used.

Plasticizers, or water-reducing agents, have been used in cementitious compositions for many years. They are polymeric polyelectrolyte compounds that bond to the surfaces of finely comminuted solids, including many that are not cementitious, and create an enhanced negative surface charge thereon. Since all the particles thus become like charged, they tend to repel each other. This results in deagglomeration of clusters or particles, and the separated, dispersed particles are much more mobile in the aqueous medium than are the large, angular clumps. The tiny particles are themselves angular, and normally tend to interlock somewhat so as to reduce the fluidity of the slurry. When strongly surface charged, they repel each other so as to provide space for free rotation and movement in the water of slurry, resulting in greater fluidity. The user may confine his benefits from such additives to the higher slump, or workability, thus obtained without degrading the composition by adding excess water, or he may elect to reduce the amount of mixing water used, thereby improving the quality of his cementitious composition while maintaining normal workability.

The most widely used plasticizing agents are the lignosulfonates, by-products of the paper industry. The principle objection to them is that they retard the rate of hydration, or hardening, of cementitious materials, hence can be used only in limited dosage. More recently, two synthetic polymers have found increasing popularity, mainly because they induce a higher level of surface charge and because they do not adversely affect the hydration reaction. The compounds are sodium naphthalene sulfonate (monomer) condensed (polymerized) with formaldehyde (U.S. Pat. No. 2,141,569 to George R. Tucker, 1938) and sodium melamine sulfonate condensed with formaldehyde, developed in Germany. It is at least theoretically possible to develop other equally effective plasticizers beginning with various monomers. Such compounds are designated as "superplasticizers," or "high range water reducing agents" in current terminology. A major advantage to their use, over lignosulfonates, is that they cause only a slight retardation of cement hydration.

As noted, the superplasticizers can be used to maintain fluidity in a composition even when 30% to 50% less water is used. Their merit in tunnel backfilling is in providing high fluidity as normal or low water contents. As elsewhere discussed, this significantly reduces segregation and "bleeding," the formation of a water layer on the top of the cast that eventually becomes a weakening void. A further advantage is that as the water content of a cementitious composition is reduced the rate of hydration or hardening is proportionately increased, as is well understood in the art. The compositions generally used in tunnel backfilling are preferably made as low as possible in the expensive cement fraction, hence normally develop strength slowly when made with the usual high water contents of present art. If the water content is reduced and the fluidity maintained by use of superplasticizer, the composition will gain strength much more rapidly and attain much higher strength levels. This can be exploited by reducing the expensive cement fraction of the composition to a level that has the same performance characteristics as the high water mixture.

In the present invention, the enhanced fluidity is further exploited to permit the use of high dosages of the pituitous water thickening agent, to levels that would otherwise cause the composition to become too stiff for rapid flowing in the tunnel cavities.

SUMMARY OF THE INVENTION

The present invention provides a superior composition for tunnel and other underground backfill that remedies the shortcomings of the present art and a method for preparing the same.

It is an object of this invention to provide a free-flowing cementitious material for use in backfilling, whereby to minimize the number of entry or injection points along the tunnel or cavity length.

It is a further objective to provide a cementitious composition that will remain cohesive in the presence of still or running water, resisting dilution and segregation of its components, particularly its cementitious fraction.

Yet another objective is to provide a cementitious composition that is highly impermeable to water penetration, even under pressure, both as it is being placed and after it hardens.

Another objective is to provide a composition wherein the strength of the final set cast may be controlled by varying the composition, whereby to achieve maximum economy of the fill material.

The present invention consists of a method of providing mortar having a low slump of 2 to 4 inches by virtue of limiting the water/cement ration to 0.45 or less and which may also contain a pozzolan such as fly ash for reasons of economy or physical properties, adding thereto a plasticizing agent that enhances the fluidity of the deliberately low water content mix whereby to increase the slump to a level of 8 to 10 inches, then adding thereto a selected, slow-dissolving water thickening agent at a dosage rate much higher than heretofore used in the art. The ingredients of the composition must be combined in this specific order to produce the superior backfill. As a final step to obtain maximum economy, pregenerated foam may be added to the mortar composition whereby to reduce the density and enhance the fluidity.

The compositions that can be made by the teachings of this invention will flow readily by gravity or pump placement through lengths of tunnel backfill or annulus voids not heretofore attainable by prior art. The strength of the composition can be easily controlled by the proportioning of the ingredients and use of foam so as to obtain minimum cost. The composition will not dilute in contact with free water flowing or ponded in the cavity, and the placement of the composition will displace any water present in the cavity without dilution or desegregation of the mortar. The composition then hardens or sets by hydration of the cementitious component while the water thickening agent continues to swell, so that the final set mass develops a slight expansion and becomes a permanent, water-impermeable seal.

DETAILED DESCRIPTION

Since sand/portland cement mortar or grout and sand/gravel/cement concretes are widely and readily available, it is advantageous to use these ingredients as the basis of tunnel backfilling compositions. Processed fly ash is also widely available for use as a cement-extending pozzolan. Such compositions can be satisfactorily mixed and delivered in conventional ready-mix concrete equipment. Cellular or foam and light weight aggregate concretes require special mixing equipment for best results, since foam and expanded perlite or vermiculite tend to float on the cement slurry in ready-mix equipment, and cement and water slurries themselves should be made with special mixing to attain lump-free uniformity. Accordingly, the sand/cement mortars are more convenient and less expensive to use.

A key ingredient in the composition of the present invention is the water thickening agent. Agents, natural or synthetic, heretofore used in cementitious compositions, dissolved in and absorb water, i.e., thicken, relatively rapidly, e.g., 10 to 20 minutes, under the mixing action that must be imparted to the fluid cementitious compositions used. By contrast, the water thickening agents used in the present invention must absorb water and disperse slowly, preferably taking 6 to 36 hours to reach stability.

The molecular chains of most water thickeners are relatively straight lined, i.e., not highly convoluted or brached, and they depend on their high molecular weight length to produce the thickening action in a manner akin to that of cellulose or cotton fiber in water, as in paper pulp. The molecular weights range from 25,000 to several million, and in general, the straighter the chain, the more rapidly the agent will dissolve and disperse. In their anhydrous, powdered state, the chains appear as coils, rolls, balls or random bundles, and these quickly and easily straighten to become fibrous when wetted, attaining ability in a short time. As gels, they impart lubricity for flow in pipelines and the like even though they have increased the viscosity of the solution.

The typical characteristics of the majority of water thickeners, including such natural clay minerals as bentonite and montmorillinite, do not achieve the objectives sought by the present invention, mainly because they reach stable state quickly. Since the mixing, delivery and placing operations for a batch of tunnel backfilling mortar may require 1 to 2 hours, development of full thickening action would obviously be detrimental to the fluidity or slump of the mortar and if the thickener is fully dissolved and dispersed prior to placement, its contact with ground water in the cavity would simply result in dilution, with attendant weakening of the mortar.

One type of thickener has been determined to be satisfactory to produce the results required by the invention, namely the specially polymerized, high molecular weight ethylene oxides, as manufactured by UCAR (formerly Union Carbide and Carbon Corp.) and sold under the trademark "Polyox." Specifically, the most economical and effective of this class of thickener are WSR 301, WSR 1125, Polyox Coagulant and FRA, these having molecular weights of 4,000,000, 5,000,000, 7,000,000 and 7,000,000 respectively. The WSR 205 resin, with a molecular weight of 600,000 can also be used, but the dosage level required is so large as to be much less econominal, and it reaches stability in 4 to 8 hours compared to 8 to 24 hours for the higher molecular weight resins.

The above ethylene oxide resins are particularly characterized by forming solutions that are stringy or pituitous, which is to say that in addition to thickening water, both by entrapment of water molecules and by hydration of the resin, the resin molecules tend to interlock to form continuous chains or filaments or strings. Such a wetting structure on the surface of solids in the aqueous mixture results in the solids becoming very cohesively bonded to each other, and the thus thickened water does not readily absorb or dilute with external free water. Accordingly, mortar made with the Polyox resins resists dilution and remains cohesive even under water jet action.

The polymerization technique developed by UCAR is, of course, proprietary, but full details of the behavior of the Polyvox resins can be found, for example, in the UCAR General Information Bulletins such as F-40246. The following example illustrates the novel application in the present invention.

A typical mix of the present invention for a cubic yard of tunnel backfill mortar would be:

Sand, FM 2.7: 2635 lbs.
Portland Cement, Type I: 360 lbs.
Fly Ash: 360 lbs.
Superplasticizer (solids): 3.0 lbs.
Water: 335 lbs.

This mortar would have a slump of about 9 inches when made up, absent any addition of water thickener.

The dosage of water thickener would be 3.5 lbs. per cubic yard, if this mix is to be used in a backfill severely subject to ground water flow. This amounts to a 1.04% solution strength based on the 335 lbs. of water used, and if Polyox 301 were fully dissolved in that amount of water, the solution would have a viscosity of 2000 centipoises, according to the UCAR technical data Bulletin F-40246; the viscosity using Polyox WRS 1125 would be 4000 centipoises. However, if these thickeners were added predissolved, it would be impossible to mix the mortar with so thick a solution, and even if it were possible, the mix would not flow.

Since 24 to 36 hours are required for this type thickener to fully dissolve and uniformly disperse, it follows that only 20% to 25% of the resin will be dissolved during the first 1 to 2.5 hours prior to placement of the mortar. At this solution strength level, the viscosity of the liquid fraction of the mix will reach a level of only 100 and 300 centipoises for the respective resins accordingly to UCAR technical data Bulletin F-40246, so that in the practice of the invention, the slump of the mortar is decreased only to the level of about 7 inches instead of to zero.

During the first three days after placement of the mortar, roughly half of the free water will be removed by the hydration of the cement and adsorption by the fly ash. This results in doubling the concentration of the thickener in the free water remaining. According to UCAR Bulletin F-40246, at the 2% concentration, the viscosity of the WSR 301 will be 12,000 centipoises, and for WSR 1125 it will be over 14,000 centipoises, and at this "paste" viscosity free water cannot penetrate the mortar or seep or percolate therethrough. What would have normally been free water in the mortar will have become an immiscible, elastic solid. In the unlikely event that the mortar ever reached a completely dry state, the resins would become plastic films in the capillary channels of the set cast and continue to act as barriers to the passage of free water.

Several other important benefits derive from this discovery. The slow acting thickeners do not lock up the free water of the composition quickly, as in prior art, so that the mixture retains much of its important fluidity or flowability during the critical placement period. Much higher dosages of the agent can thus be used without workability impairment. Even at the initial low levels of solution and dispersion, these agents still impart lubricity to the composition, facilitating pumping and flow in narrow spaces, and will also fortify and stabilize any foam used in the composition. The incompletely dissolved granules initially resemble gelatinous, plastic balls, so that the addition of a very small amount of water to the mix just prior to placement can impart a temporary slickness to their surfaces, causing them to behave like ball bearings and thus inducing a highly useful and disproportionate increase in the fluidity of the composition.

The presence of the long molecular chain, slow-dissolving thickening agents of the present invention further results in a composition having unusually high cohesiveness. If the composition is poured into still water, it will not separate or become diluted, and little of the cementitious component will be leached out, even though the composition is left to harden in the submerged state. Furthermore, if a stream of water is directed at a moving or stationary mass of the composition, it will not disperse it or leach out the fine particles of cementitious ingredient. Accordingly, the compositions of the present invention can be placed in cavities containing water or where running ground water is encountered, without loss of integrity or properties.

The final, and perhaps most important contribution of the slow dissolving water thickening agent to this improved composition occurs after placement. In the delayed action, the free water in the composition continues to be absorbed by the growing gel, becoming immobilized against the migration that creates voids at the top of the cast, and against escaping into dry or porous soils where it would be lost to the hydration reaction. Furthermore, the delayed swelling creates a slight expansion while the composition is still in the plastic state, thereby insuring complete filling of all cracks and crevices in the cavity and liners. When the cementitious composition has fully hydrated, about twenty-six parts, or more than half of the original mixed water has become chemically combined, so that the concentration of thickener in the residual water is doubled. This semisolid gel completely fills all capillaries and intercrystalline spaces in the hardened composition, rendering it impermeable to water penetration, so that the set cast seals the tunnel walls completely.

The compressive strength of backfill material used in tunnel and underground structure lining and backfilling usually need to be no greater than that of the surrounding earth under lithostatic pressure. This may range from 30 to 150 pounds per square inch. The tunnel segments and structures are designed and reinforced to carry both earth pressures and service loads, so usually do not require supplemental support from the fill. However, there are sometimes conditions that make it very useful to utilize fill compositions that will contribute to the rigidity and structural capacity, such as where lateral earth movement, earthquake potential, concentrated loading as from rock formations and other factors may be encountered. Accordingly, it is highly useful to be able to vary the strength of the fill material at will, for reasons of economy, without significantly changing its flow and placement characteristics. The sand-cement mortars and concretes commonly used can be varied in strength by using greater or lesser amounts of the cementitious component, but this alters the flow characteristics unless more water is substituted for the cementitious material deleted. Fly ash or other finely comminuted pozzolanic materials can be substituted for cement, also, at some cost savings return for the strength reduction.

Concrete, mortar and neat cementitious materials, in their wet states, weigh 120 to 150 pounds per cubic foot, and, when placed as backfill, exert over twice the hydraulic and flotation pressure of water. Since the cavities being backfilled do not fill evenly, as they might using a low viscosity liquid such as water, there is a constant unbalance in the hydrostatic load on the structure. Pipe joints get warped out of line, seals become displaced, and the structures sometimes even fail under the stress. The usual remedy is to place the dense fill in several "lifts" or layered pours, allowing time between placements for the material to become reasonably rigid by hydration of the cementitious component. For low strength compositions, 50 to 200 pounds per square inch, this may entail several days' delay with attendant higher cost.

Stable, aqueous foams made with a variety of continuous-output generating equipment well known to the art, are used extensively in the production of low density "concretes," these being cement-water slurries blended with the pregenerated foam to produce non-structural, poured-in-place insulation for roof decks, foundation insulation, fireproofing for safes and similar applications. Such foams, weighing only 2 to 3 pounds per cubic foot, are much lower in cost than lightweight aggregates, such as expanded vermiculite and perlite, do not absorb water, and are less prone to flotation separation in the fluid mixtures desired for backfill work. More important, however, is that the foam actually improves the fluidity of the mix, in the same manner as air entrainment does for concrete. The lower the density, i.e., the more foam used per unit of volume, the lower the strength of the finished product, so that the foam can be used economically to attain the strength level desired. The lower the density, the less cementitious material used per unit of volume, a valuable cost savings since foam costs only $3.00 per cubic yard, replacing 10% to 80% of the more expensive solids.

There are two important prerequisites for the foams used in tunnel backfill mortars. First, the foam must be stable in its environment, which consists of a high pH, i.e., 11.8 to 12.2, characteristic of portland cement, if same is used as the binder, and the presence of the strong polyelectrolyte superplasticizers. It must remain stably intact for whatever period of time is required for the cementitious material used to hydrate to a strength level at which the matrix is self supporting.

Secondly, the foam must be of the discrete, or closed, cell type. Most foam agents form open cells in cement slurries. Since the encapsulated air can escape through the walls of such cells, free water can readily flow into the pore and progress through the entire mass. This would greatly defeat the objects of the present invention. Air cannot escape through the films of a discrete, closed-cell foam, hence, water can permeate the cast only by slow capillary movement through the crystal matrix of the cement. In the present invention, even this limited penetration is prevented by the presence of water thickener in said capillaries.

In prior art practice the use of foam with mortars of sand, cement and water is limited to density reductions no lighter than 90 pounds per cubic foot, since normally at that point, the foam/cement/water fraction of the composition becomes too low in specific gravity to keep the sand in suspension. However, we have found that when the composition includes the water thickeners of the class disclosed for the present invention, the solid components are rendered cohesive and do not stratify or settle out until the density is decreased below 50 pounds per cubic foot. This discovery is important, since it permits standard mortars, widely available from ready-mix concrete suppliers, to be used economically and universally at low densities not heretofore attainable.

Prior art practice in the simultaneous use of two or more beneficiating additives with cementitious compositions does not specify any order of assembly of the components of the mix, and the plurality of additives are usually introduced as a single blend at any convenient time or else preblended with one of the components, i.e., the water, the sand or the cementitious material. Typical examples are found in U.S. Pat. No. 2,690,975 to Edward W. Scripture, Jr., U.S. Pat. No. 2,757,096 to David Tierston, U.S. Pat. No. 2,927,033 to Stephen W. Benedict, U.S. Pat. No. 3,215,548 to Charles A. Vollick, U.S. Pat. No. 3,689,294 to Stephen Braunauer, U.S. Pat. No. 3,686,133 to Kenichi Hattori et al, U.S. Pat. No. 3,359,225 to Charles F. Weisend, and others. All of these use additives similar and related to those of the present invention.

For the present invention, it was discovered that following the method teachings of prior art produced limited and sometimes adverse results. The order of assembly of all the components of the composition was found to be critical to the properties and success of the final product.

In the practice of the present invention, and when using ready-mix truck or other batch-type mixers, all of the coarse aggregates, if any is used, but only 40% to 50% of the fine aggregates are introduced first, to preclude "balling" of the cementitious material and its caking or coating on the mixer walls and blades. This is followed by addition of all the cementitious material, including pozzolans, and all of the water. Next the superplasticizer is added, then the balance of the sand, and finally the water thickener in dry powder form. The composition is then thoroughly mixed, and this can be accomplished during transit to the point of use in the conventional ready-mix manner. If foam is to be included in the composition, it is added just prior to discharge of the composition from the mixer into the pump, downhole or other method of placement.

There are significant reasons why this procedure must be followed to obtain optimum results and economy. By extensive research and testing, it was determined that, to be most effective, the superplasticizer should not be added until the surfaces of the cementitious material become wetted and thereby acquire a low-order negative surface charge of their own. Thereafter, the similar low-order positive charge sites along the superplasticizer molecule can reaily match with the negative charges on the particles, bonding the superplasticizer molecules securely thereto and resulting in the much stronger negative charge of those molecules creating the repelling/dispersing force desired. On the other hand, if the superplasticizer is in solution in the water first, some degree of charge neutralization or disorientation apparently occurs, and 50% to 100% greater dosage of superplasticizer is required to attain results equal to the teaching of the present invention at a cost of about $7.00 per cubic yard.

Perhaps partly because of the high dosage used, compared to prior art teaching, the presence of water thickener in the mix prior to or concurrent with the addition of the superplasticizer renders the latter practically ineffective. It is not clear whether the very long chain thickener molecules "entangle" those of the superplasticizer, or whether the thickener forms a protective, nonionic colloid on the surfaces of the solids in the composition, or whether the superplasticizer cannot dissolve in thickened water, or whether some other explanation applies. Premature addition of the dry thickener simply results in severe loss of fluidity.

Some types of water thickeners are occasionally used as foam "fortifiers" or stabilizers, reinforcing the bubble films of the foam. When so used, the thickeners are dissolved in the water first and allowed to reach stable dispersion before the foam agent is added to form the foam solution. However, if foam has been blended and dispersed in a plastic mass, e.g., a cementitious composition of the present invention, and dry, pulverent thickening agent is then added, the opposite result will occur. The hygroscopic behavior of the thickening agent will dehydrate the foam, causing it to collapse. Accordingly, in the practice of the present invention, it is specified that the foam be added as the last component, after all other ingredients have been thoroughly blended and there has formed around the thickener granules a gel film that slows down the rate of water absorption by the undissolved core.

In prior art practice, water thickeners are often prepared as concentrated solutions for convenience of addition and dispersion in the composition to which it is to be added. This practice would completely defeat a major purpose of the use of the thickener in the present invention, wherein it is important that the agent accomplish a substantial fraction of its thickening or gelling during and after placement of the cementitious composition. This can be achieved only by the delayed addition of the slow dissolving pituitous thickener in dry powder state, as herein specified. Since the thickener powder is relatively light in bulk density, care must be exercised during its addition to insure rapid and uniform dispersion, as by sifting or by air stream dispersion over the turbulent surfaces of the mortar during mixing. The powder grains become very adhesive immediately upon being wetted, so can readily form clumps or balls that are difficult to deagglomerate.

In the practice of this invention, it is convenient to disperse the dry powder thickener on the second charge of sand, if the sand is being introduced into the mixer by conveyor belt or bucket elevator. If the sand must be charged by gravity, as from an overhead silo, the powder can be dispersed in the stream from an air stream tube. There are other means known to those in the art, including the preblending of the powder with dry sand or fly ash bulking agents to improve the dispersion.

The following specific examples will illustrate the method and compositions of the present invention. The first example is for use in tunnel cavities having a high ground water seepage as well as considerable ponded water. The second example illustrates a composition ideally suited for "dry" tunnel cavities in which the ground water or ponded water volume is minor, hence suitable for compositions that contain pregenerated foam as a component of the mortar.

EXAMPLE

1. A ready-mix concrete truck is loaded with the following components, expressed as pounds per cubic yard, in the order shown:
Sand: 1315 lbs.
Portland Cement, Type I: 330 lbs.
Fly Ash: 330 lbs.
Water: 300 lbs.
Superplasticizer, Active Ingredient: 3.0 lbs.
The slump mix at this point is 11 inches or more. Next, add:
Sand: 1315 lbs.
WSR 301 Water Thickener
Powder: 3.5 lbs.

The resulting slump is 6 to 7 inches, and is suitable for free-fall or pump placement, and up to 400 lineal feet of tunnel backfill, at a volume of 0.5 cubic yards per foot, can be pumped from a single downhole. This compares to 100 to 125 lineal feet using conventional mortars.

The strength of the above mix design averages 1000 pounds per square inch at seven days and 1300 pounds per square inch at 28 days, with a wet density of 130 pounds per cubic foot. If the 330/330 ratio of cement to fly ash is reduced to 260/400, the 7-day strength will be reduced to 700 pounds per square inch, and for a 140/520 ratio, the strength will be 450 pounds per square inch, but these mixes will provide a cost reduction of $2.10 and $7.20 per cubic yard, respectively. Conversely, for a higher cement factor, such as 420/320, the 7-day strength will average 1300 pounds per square inch, but the cost will be increased by $1.50.

When the above mixes were subjected to severe washing by water streams, both in the laboratory and in field tests, the mortars showed a strength loss of 20% to 45%, being highest for the low-cement factor mix, as would be expected. The field samples were obtained from the pour after removal of the bulkheads. By contrast, conventional mortars, even made with all cement and no fly ash, gave 7-day strengths no higher than 200 pounds per square inch. Normally, such a mortar would reach levels of 4000 to 4500 pounds per square inch at seven days, but its cost would be about $8.00 per cubic yard higher than for the 330/330 mix design.

It will be clear to those skilled in the art that the strength of the mortar can be varied in other conventional manners. The ratio of sand to a given cement/fly ash proportion can be decreased from the 3.55 to 1 level, above illustrated, to 2.5 to 1 or even 1 to 1. This will increase strength and, to some degree, fluidity or slump, but at high cost, since the cement factor per cubic yard will rise sharply, and the mixes would require higher dosages of both superplasticizer and thickener because of the increase in specific surface of the fines fraction on which the dosage is dependent. Increasing the proportion of sand to fines (cement plus fly ash) reduces the paste fraction (cement, fly ash, water) and this in turn reduces the basic fluidity of the mortar, hence higher dosages of superplasticizer are required, offsetting the savings of the lowered cement factor.

Another common approach to changing the strength of a given mix design is to alter the water-to-cement plus fly ash ratio, or w/c. Increasing the w/c decreases the strength and density, in accordance with a well-established semiparabolic curve. Increasing the water volume will obviously invrease fluidity and thus would permit reduction in the amount of superplasticizer dosage, but to counter the increased ability for the various components to settle out and stratify, during the now-retarded setting time, the thickener dosage would have to be increased, negating some of the gain in fluidity and all of the gain in cost. Conversely, a lower w/c would require more superplasticizer and less thickener, and would give higher strength, which might be capitalized by using a lower cement-to-fly ash ratio. Such a mix would have a shorter pot life, which is to say it would stiffen or thicken more quickly and thereby limit the amount of mortar that could be placed through a given port or downhole. The pot life of the illustrated mix is about three hours, at 80° F.; reducing the w/c to 0.40 would reduce the pot life to about 1.5 hours, so would require twice as many expensive downholes or larger, more expensive pumping equipment of double capacity.

EXAMPLE

2. When pregenerated foam is included as one of the mix components, certain changes in the mix design are necessary for reasons which will be discussed hereinafter. A typical economical mix comprises the following, in the order given. Weights are pounds per cubic yard of foamed mortar.
Sand: 768 lbs.
Portland Cement, Type I: 235 lbs.
Fly Ash: 185 lbs.
Water: 206 lbs.
Superplasticizer, Active
Ingredient: 1.2 lbs.
The above mix has a slump of 11 inches; after 2 to 3 minutes of mixing to reach uniformity, add:
Sand: 768 lbs.
Water Thickener WSR
301 Powder: 1.5 lbs.

This reduces the slump to 6 to 7 inches. Mixing is continued for 4 to 5 minutes, or can be completed during transit to the placement site in a ready-mix truck. Prior to placement, preferably no more than 5 minutes, introduce 12.5 cubic foot of pregenerated aqueous foam made from a 4% to 6% solution of resin base foaming agent, such as Mearlcel 3532 or 3499, expanded by pregeneration to a foam of 2 to 3 pounds per cubic foot density. The finished cubic yard of mortar will have a wet density of 80 pounds per cubic foot, a slump of 6 to 8 inches, a 7-day strength of 200 to 250 pounds per square inch and a 28-day strength of 400 pounds per square inch. It will cost about $8.00 less per cubic yard than the mix of example 1, above, hence about $16.00 less per cubic yard than conventional mortar.

The foam mortar mix design was given a field test on a large, long tunnel backfill, requiring about 1 cubic yard of fill per lineal foot of tunnel. In a continuous pour, a total of 950 cubic yards was placed by free-falling the mortar down 40 feet into the cavity through a 14 inch diameter downhole; no pumps were used. The placement rate averaged 2.5 cubic yards per minute. A total of 850 lineal feet of tunnel was filled before the flow rate fell to zero. It is believed that this may be a record placement for free-fall tunnel backfill flow from a single fill point. The cost of material was about $10.00 per cubic yard less than for a 45 pounds per cubic foot cellular concrete that would have the same strength, and which might possibly be pumped for such distances. The cellular concrete, however, would not provide the same water sealant properties; the interior of this test tunnel has remained dry and leak free even though flooding of a nearby river has several times resulted in a water level 40 to 45 feet above the level of the tunnel.

Sampling of the concrete after removal of the bulkheads disclosed that the in-place density of the concrete was 90 pounds per cubic foot instead of the 80 pounds per cubic foot at which it was placed. This was due to the combination of elevation and friction head compressing the air of the foam. At this density the strength had increased to 600 pounds per square inch instead of the 400 pounds per square inch that would be typical of an 80 pounds per cubic foot density. Obviously, an increase in the volume of foam added would result in a compensating lower initial density that would, in turn, make for an in-place density of 80 pounds per cubic foot, if desired.

To illustrate the difference between the mix design of mortar intended for foaming for use in "dry" tunnel cavities and that used in example 1, being mortar for high water conditions, the above quantities are herewith expressed in pounds per cubic yard of mortar, unfoamed:
Sand: 1315 lbs.
Cement: 400 lbs.
Fly Ash: 320 lbs.
Water: 360 lbs.
Superplasticizer: 2.0 lbs.
Sand: 1315 lbs.
Water Thickener: 2.5 a lbs.

When 20 cubic feet of 2.5 pounds per cubic foot pregenerated foam is added to the above, the yield is 47 cubic feet of 80 pounds per cubic foot mortar.

It will be seen that the paste fraction has been increased both as to solids content, from 660 pounds total to 720 pounds, and as to water content, from 0.45 to 0.50 w/c, i.e., 60 pounds or 7.2 gallons per cubic yard. This is because the foam incorporates with the paste to form a cellular mass in which, essentially, the sand is uniformly dispersed, and if there is not sufficient mass, the larger sand grains will segregate. The cement/fly ash ratio is increased to provide strength in the matrix to replace that lost by foaming to low density. The w/c is increased because the highly expanded foam is somewhat hygroscopic and thus competing with the cement for available water. It may be noted that by making the foam wetter, e.g., by increasing its density from 2 to 3 pounds per cubic foot to 4 to 4.5 pounds per cubic foot, the fluidity of the foamed mortar will be substantially increased with very little increase in total water content of the mix.

Since the foam fluidizes the mix, the dosage of superplasticizer is reduced for economy. Furthermore, the discrete cell pregenerated foam specified for practice of the present invention will, with cement paste, make a fairly impermeable cellular concrete, hence its use permits reduction in the quantity of water thickener required. The two materials are highly compatible, since the long chain molecules of thickeners, especially the pituitous type, are structurally similar to the molecules of foam agents. Together they reinforce each other to produce greater foam stability.

In the research of the present invention, it was discovered that most of the several hundred commercial foam agents available are not compatible with the strong electolyte superplasticizers that are most effective with cementitious maaterisla, i.e., the sodium naphthalene and melamine sulfonate condensates. Only three were found to be stable, to wit Mearlcel 3532, Mearlcel 3499 and Mearlcel 3728, all manufactured by Mearl Corporation, Roselle Park, New Jersey as proprietary compounds, reportedly blends of synthetic surfactants comprising nonionic polyethylene oxide alkyl ethers, anionic alkyl sulfates and alkyl sulfonates. Obviously, the foam used in tunnel backfill operations must remain stable both during the turbulence of mixing and placement, and subsequently at rest until the cementitious material hardens to become self supporting, which is 6 to 8 hours. Foam stability was measured by filling a vertical tube 6 inches in diameter by 8 feet high and measuring the cavitation or shrinkage of the top surface of the foamed grout.

Having thus described the compositions of mortars superior in properties and cost to that of prior art, and the method for making same, what we claim is as follows.

What is claimed:

1. A method for preparing a highly flowable cohesive sealing grout for backfilling tunnels and similar underground structures comprising the steps of:
   (a) charging a mixing means with 6 to 8 parts by weight of sand;
   (b) adding to said sand 1½ to 3 parts by weight of water and 3 to 6 parts by weight of cement while maintaining the mixing agitation to form a grout;
   (c) adding to said grout 0.01 to 0.05 parts by weight of a plasticizing agent selected from the class of water soluble metal salts consisting of the condensation products of an aldehyde and an aromatic sulfonic acid to form a plasticized grout;
   (d) maintaining said plasticized grout in a state of agitation while adding concurrently 6 to 8 parts of sand and 0.02 to 0.04 parts by weight of a pituitous water soluble polyethylene oxide thickening compund having a molecular weight of about 2 million to about 7 million;
   (e) agitating said plasticized grout for a period of time that will insure uniform dispersion of all ingredients; and
   (f) discharging said grout into means for placing it promptly at the desired point of use.

2. The method as defined as defined by claim 1, wherein said step of adding sand is carried out by adding calcareous aggregate of suitable gradation.

3. The method as defined by claim 1, wherein a finely comminuted pozzolan is substituted for 2.5 to 5.0 parts by weight of cement prior to the addition of a plasticizing agent.

4. The method as defined by claim 3, wherein said pozzolan is fly ash.

5. The method as defined by claim 1, wherein the step of adding water and cement to the sand is carried out with 2 parts by weight of water and 4 parts by weight of cement.

6. The method as defined by claim 1, wherein said step of adding water and cement to the sand is carried out by adding 2 parts by weight of water, 2 parts by weight of cement and 2 parts by weight of fly ash.

7. The method as defined by claim 1, wherein the aldehyde is a formaldehyde.

8. The method as defined by claim 1, wherein the water soluble metal salt is a sodium salt.

9. The method as defined by claim 1, wherein the water soluble metal salt is a calcium salt.

10. The method as defined by claim 1, wherein the aromatic sulfonic acid is naphthalene sulfonic acid.

11. The method as defined by claim 1, wherein the aromatic sulfonic acid is melamine sulfonic acid.

12. The method as defined by claim 1, wherein the plasticizing agent is water soluble metal salt of lignosulfonic acid.

13. The method as defined by claim 1, wherein the pituitous water soluble resin thickening compound has a molecular weight of about 4 million.

14. The method as described in claim 1, wherein prior to discharging said grout, the additional step is carried out comprising:
   (a) adding to and blending with said plasticized grout a quantity of pregenerated foam sufficient to reduce the density of said plasticized grout to the level of 50 to 100 pounds per cubic foot with said foam being made from a foam solution of 3% to 6% foam agent concentrate which is expanded by compressed air to a foam density of 2.0 to 4.5 pounds per cubic foot.

15. The method as defined by claim 14, wherein a finely comminuted pozzolan is substituted for 2.5 to 5.0 parts by weight of cement prior to the addition of a plasticizing agent.

16. The method as defined by claim 15, wherein said pozzolan is fly ash.

17. The method as defined by claim 14, wherein the step of adding water and cement to the sand is carried out with 2 parts by weight of water and 4 parts by weight of cement.

18. The method as defined by claim 14, wherein said step of adding water and cement to the sand is carried out by adding 2 parts by weight of water, 2 parts by weight of cement and 2 parts by weight of fly ash.

19. The method as defined by claim 14, wherein the aldehyde is a formaldehyde.

20. The method as defined by claim 14, wherein the water soluble metal salt is a sodium salt.

21. The method as defined by claim 14, wherein the water soluble metal salt is a calcium salt.

22. The method as defined by claim 14, wherein the aromatic sulfonic acid is naphthalene sulfonic acid 23. The method as defined by claim 14, wherein the aromatic sulfonic acid is melamine sulfonic acid.

24. The method as defined by claim 14, wherein the plasticizing agent is water soluble metal salt of lignosulfonic acid.

25. The method as defined by claim 14, wherein the pituitous water soluble resin thickening compound has a molecular weight of about 4 million.

26. A cementitious composition for backfilling and sealing tunnels, tunnel liners and similar underground structures comprising:
   (a) 12 to 16 parts of sand;
   (b) 3 to 6 parts by weight of cement;
   (c) between 1½ to 3 parts by weight of water;
   (d) between 0.10 to 0.05 parts by weight of a plasticizing agent selected from the class of water soluble metal salts and the condensation product of an aldehyde and an aromatic sulfonic acid; and
   (e) between 0.02 to 0.04 parts by weight of a pituitous water soluble polyethylene oxide thickening compound having a molecular weight of about 2 million to about 7 million.

27. The composition defined in claim 15, further comprising a pregenerated acqueous foam of density 2 to 4.5 pounds per cubic foot made from a foam solution of 3% to 6% foam agent concentrate in water.

28. The composition defined in claim 26, in which up to 2.5 to 5.0 parts by weight of cement are replaced by a finely comminuted pozzolan.

* * * * *